(12) United States Patent
Thurm et al.

(10) Patent No.: US 6,941,920 B1
(45) Date of Patent: Sep. 13, 2005

(54) MOTORCYCLE ENGINE AND TRANSMISSION INTERBRACING MEMBER

(76) Inventors: Kenneth R. Thurm, 2348 N. Rockridge Cir., Orange, CA (US) 92867; Scott Longnecker, 5355 Fallsway Unit H, Buena Park, CA (US) 90631

( * ) Notice: Subject to any disclaimer, the term of this patent is extended or adjusted under 35 U.S.C. 154(b) by 57 days.

(21) Appl. No.: 10/816,631

(22) Filed: Apr. 2, 2004

(51) Int. Cl.[7] ............................... F02F 7/00; B60K 5/12
(52) U.S. Cl. .............................. 123/195 C; 123/195 R; 123/198 E; 180/219; 180/291
(58) Field of Search ....................... 123/195 R, 195 A, 123/195 C, 198 E; 180/219, 291, 300, 377

(56) References Cited

U.S. PATENT DOCUMENTS

| | | | |
|---|---|---|---|
| 4,421,195 A | * 12/1983 | Aiba | ........................... 180/228 |
| 5,078,105 A | * 1/1992 | Ito et al. | .................. 123/195 R |
| 5,570,753 A | 11/1996 | Carlini | |
| 6,085,855 A | 7/2000 | Schanz et al. | |
| 6,176,211 B1 | * 1/2001 | Tanaka et al. | ........... 123/90.61 |
| 6,241,040 B1 | 6/2001 | Schanz et al. | |
| 6,315,072 B1 | 11/2001 | Brown et al. | |
| 6,637,398 B2 | * 10/2003 | Suzuki et al. | ........... 123/195 R |

* cited by examiner

Primary Examiner—Weilun Lo
(74) Attorney, Agent, or Firm—Stetina Brunda Garred & Brucker (57) ABSTRACT

An interbrace is provided for reducing torquing, twisting, and pivoting between a V-twin engine and a generally separate motorcycle transmission. A first embodiment of the interbrace includes a forward engine flange portion, a rearward transmission end cap portion which functions as a transmission end cap, and a connecting portion interconnecting the engine flange portion and the transmission end portion. A second embodiment of the interbrace includes a forward engine flange portion, a rearward transmission end plate flange portion, and a connecting portion interconnecting said engine flange portion and said transmission end plate flange portion.

33 Claims, 7 Drawing Sheets

MOTORCYCLE ENGINE AND TRANSMISSION INTERBRACING MEMBER

CROSS-REFERENCE TO RELATED APPLICATIONS

Not Applicable

STATEMENT RE: FEDERALLY SPONSORED RESEARCH/DEVELOPMENT

Not Applicable

BACKGROUND OF THE INVENTION

1. Field of the Invention

The present invention relates to aftermarket engine and transmission interbracing members for HARLEY DAVIDSON type configured motorcycles or the like. In particular, the present invention relates to a structural bracing member which may be attached to the righthand side endplate of a HARLEY DAVIDSON V-twin motor and a righthand side of a transmission, in order to reduce unwanted torquing, pivoting and twisting imparted to the drivetrain through operation of the motorcycle.

2. Background of the Invention

The passion, enthusiasm, and bond that HARLEY DAVIDSON motorcycle owners have for their bikes is well-known. Harley owners and owners of independently manufactured motorcycles and engines based from originally inspired HARLEY DAVIDSON motorcycle designs, continue to modify, customize, and/or improve their "bikes" with various aftermarket parts and accessories.

Furthermore, it is also well-known that Harley owners are very loyal to the traditional V-twin engine layouts that have been the heart and soul of Harleys since the first "Flathead" sold in 1909. However, with the heritage of the V-twin mechanical layout, comes traditional drivetrain deficiencies which have proven disadvantageous and worthy of improvement. One noticeable weak link of a traditional V-twin layout is the arrangement of the engine-to-transmission interface.

In particular, the traditional Harley drivetrain includes a V-twin engine positioned forward the transmission in which both the engine and transmission are independently secured to the motorcycle frame. In one well-known configuration, the drivetrain assembly comprises a leftside drive in which the engine includes a crankshaft and output shaft substantially parallel to an input shaft of the transmission. Engine power is coupled to the transmission with a primary belt and chain interconnecting the parallel output and inputs shafts of the engine and transmission respectively. The drive assembly additionally includes a primary drive housing on the leftside of the motorcycle for enclosing the primary belt or chain interconnecting the parallel output and input shafts.

Over time, the leftside drive has become one of the several characteristic features that motorcycle enthusiasts identify as being representative of tradition and heritage. In this well-known motorcycle drive assembly, the engine and the transmission are typically mounted together by means of generally flat horizontally cantilevered pads that overlap one another at a rear of the engine crankcase and at a front of the transmission case. The two horizontal pads are typically held together by two vertical screws. To maintain proper alignment between the engine and the transmission, the primary housing extends across and bolts to the leftside of both the engine crankcase and the transmission case. The well-known motorcycle configuration also includes a seat post extending from the seat down between the engine and transmission to a cross member joining the tubular members of the lower portion of the frame. Many motorcycle riders and enthusiasts agree that it is desirable to retain the aforementioned features to maintain a classic look.

However, the aforementioned engine-to-transmission interface inherently has its disadvantages. There is minimal direct attachment between the engine and transmission assembly, and the primary drive housing does not provide significant rigidity. For those motorcycles having a horizontal interface between the engine and transmission assembly, there is also a lack of ability to prevent pivoting of the engine about a horizontal and transverse axis with respect to the motorcycle frame.

There have been numerous approaches to solving the aforementioned problem. The entire engine-to-transmission interface has been redesigned as taught in U.S. Pat. Nos. 6,085,855 and 6,241,040 to Schanz et al. and 6,315,072 to Brown et al. However, the contribution of the aforementioned improvement applies only to later model "Evolution" engines and the modern "Twin Cam" engine. Thus, even though a significant advancement for the V-twin engine-to-transmission interface has been made, the aforementioned improvements cannot be economically retrofitted to V-twin engines produced before this significant redesign.

U.S. Pat. No. 5,570,753 to Carlini does teach a motorcycle engine and transmission torque-resisting arm which is designed to overcome the disadvantages for inherent in the traditional V-twin engine-to-transmission interface in which the engine and transmission are separately housed. In this configuration, the engine and transmission cases are coupled on the lefthand side of the primary engine case. A torque resisting arm is provided which is configured to be fitted to the opposite side of the engine and transmission cases from that which the primary engine case occupies is secured to the underlying faces of the engine case and transmission case to provide a torque resisting member there between. The torque resisting arm includes a generally planar engine attachment plate configured to be received upon the engine case and a generally planar spanning plate configured to be received upon the transmission case. The torque resisting arm further defines an offset wall and curved wall extending between the engine attachment plate and the spanning plate.

Although the Carlini torque-resisting arm is certainly an innovative and useful product, it still does have its own disadvantages. For instance, the Carlini arm only secures the three most lower outboard bolts of the engine (See FIG. 1, reference numerals 20, 21, 22) and three lower rightside oriented transmission end bolts (40, 41, 42). Since the Carlini arm is mounted to the engine and transmission in such a limited manner, the overall strengthening effect of the arm is correspondingly limited. Furthermore, the actual strength of the Carlini arm is limited by the moderate to lightweight construction of the arm.

It would be advantageous to provide an interbrace for traditional HARLEY DAVISON V-twin configured motorcycles which experience the unwanted torquing, twisting and pivoting of the drivetrain components. In particular, it would be advantageous to secure the rightsides of both the engine and the transmission with an interbracing member which acts as a supplemental support for maintaining a proper engine-to-transmission interface and to assist in properly securing the engine and transmission into the frame of the motorcycle. Preferably, the interbrace would tie the righthand side of the engine to the righthand side of the transmission. Furthermore, an ideal interbrace would have robustly proportioned mounting portions which act as mounting flanges that are directly secured to the righthand side of the engine and transmission.

BRIEF SUMMARY OF THE INVENTION

The aforementioned disadvantages are overcome by providing an interbrace for reducing torquing, twisting, and pivoting between a V-twin engine and a generally separate motorcycle transmission. In a first embodiment of the present invention, an interbrace is provided having an inboard and outboard side. The interbrace includes a forward engine flange portion, a rearward transmission end cap portion which functions as a transmission end cap, and a connecting portion interconnecting the engine flange portion and the transmission end portion. Preferably, the interbrace is milled from billet material.

According to an aspect of the present, the engine flange portion further comprises a first cam gear cavity centered about a first axis transversely oriented with respect to the outboard and inboard side, wherein the first cam gear cavity is adapted to receive cam gear components protruding from the engine. According to another aspect of the present invention, a cam gear cover may be attached to the outboard side of the engine flange portion. Additionally, the cam gear cover may be removably attached from the outboard side of the engine flange portion. In another embodiment, the cam gear cover may be integrally and unitarily formed to the forward engine flange portion.

In another aspect of the present invention, the cam gear cover has a second cam gear cavity concentrically disposed within an inner portion of the cam gear cover, and a timing cavity concentrically disposed within an outboard portion of the cam gear cover. As a result, the first cam gear cavity and second cam gear cavity may form a common concentric cavity. Moreover, a removable timing cover adapted to cover the timing cavity may be provided.

According to another aspect of the present invention, the rearward transmission end cap portion further includes an inboard offset portion which gives the rearward transmission end cap portion a thickness T which is at least the thickness of a conventional rightside transmission end cap. Furthermore, the inboard side of the rearward transmission end cap portion is adapted to interface with a rightside transmission end plate of a motorcycle. In another aspect of the present invention, the rearward transmission end cap portion thickness T allows the outboard side of the interbrace to comprise a substantially flat planar surface. Moreover, a transmission end cavity is disposed within the rearward transmission end cap portion to house components protruding from the transmission.

According to other aspects of the present invention, a transmission end cap cover may be removably attached to the outboard side of the engine rearward transmission end portion to cover the transmission end cavity. Furthermore, an internal conduit may be provided having a first port positioned on a bottom side portion of the transmission end cap portion and a second port connecting the internal conduit to the transmission end cavity.

According to other aspects of the present invention, a plurality of mounting holes are provided for attaching the interbrace to the rightside of a V-twin engine and a rightside transmission end plate. According to another aspect of the present invention, a first set of mounting holes are positioned on the forward engine flange portion such that a first bolt pattern is provided which matches that of a rightside of a V-twin engine. Also, a second set of mounting holes may be positioned on the rearward transmission end cap portion such that a second bolt pattern is provided which matches the rightside transmission end plate.

According to another aspect of the present invention, a second embodiment of an interbrace may be provided for reducing torquing, twisting, and pivoting between a V-twin engine and a generally separate motorcycle transmission. The interbrace has an inboard and outboard side. The interbrace includes a forward engine flange portion; a rearward transmission end plate flange portion, and a connection portion interconnection the engine flange portion and the transmission end plate flange portion.

According to an aspect of the present invention, the rearward transmission end plate flange portion further may be inwardly offset from the forward engine flange portion. According to other aspects of the present invention, the inboard side of the rearward transmission end plate flange portion may be adapted to function as a rightside transmission end plate of a motorcycle. In other aspects of the present invention, the forward engine flange portion and the rearward transmission end plate flange portion are oriented in a parallel manner with respect to each other, and the connecting portion interconnects the engine flange portion and the transmission end plate flange portion at an inclined angle.

According to other aspects of the present invention, a conventional transmission end cap may be attached directly to the outboard side of the rearward transmission end plate flange portion. The present invention may further include a transmission end plate cavity adapted to house components protruding from within the transmission. Furthermore, according to other aspects of the present invention, the interbrace may be formed by bending plate stock.

Other exemplary embodiments and advantages of the present invention may be ascertained by reviewing the present disclosure and the accompanying drawings.

BRIEF DESCRIPTION OF THE DRAWINGS

The present invention is further described in the detailed description that follows, by reference to the noted drawings by way of non-limiting examples of preferred embodiments of the present invention, in which like reference numeral represent similar parts throughout several views of the drawings, and in which.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Conventional Right-hand Side Configuration

Figure 1:
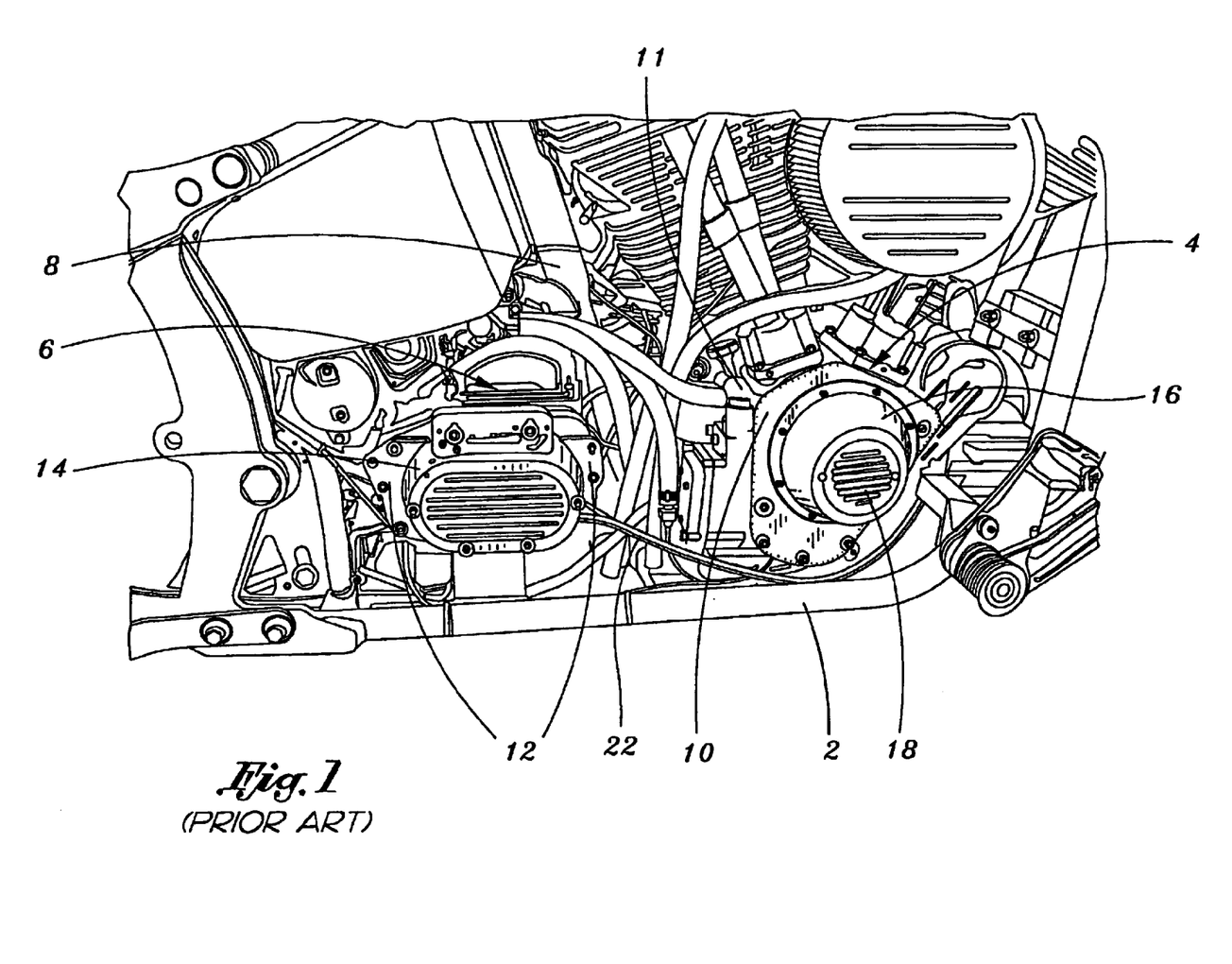
FIG. 1 is an illustration depicting the righthand side of a well-known V-twin engine and transmission of a HARLEY DAVIDSON type motorcycle.

FIG. 1 is an illustration depicting the right-hand side of a well-known V-twin engine and transmission of a HARLEY DAVIDSON type motorcycle. The V-twin engine 4 is positioned forward of the transmission 6. The motorcycle frame 2 provides structure for the engine 4 and transmission 6 to be mounted substantially independent of each other through various motor and transmission mounts. The engine 4 has a rightside engine end plate 10 and may have a separate protruding cam gear cover 16 which further includes a separate timer cover 18. Noticeably separate and distinct from the engine casing 11, the transmission 6 is rearwardly positioned after a vertical frame member 8 which is used to support the seat and upper frame members. The transmission 6 has a rightside transmission end plate 12 in which a transmission cap 14 adapted to be secured thereto. Additionally, a transmission cap cover 20 may also be incorporated into the transmission cap 14. Moreover, a clutch cable 22 is routed into the transmission cap 14.

First Embodiment of the Present Invention

Figure 2:
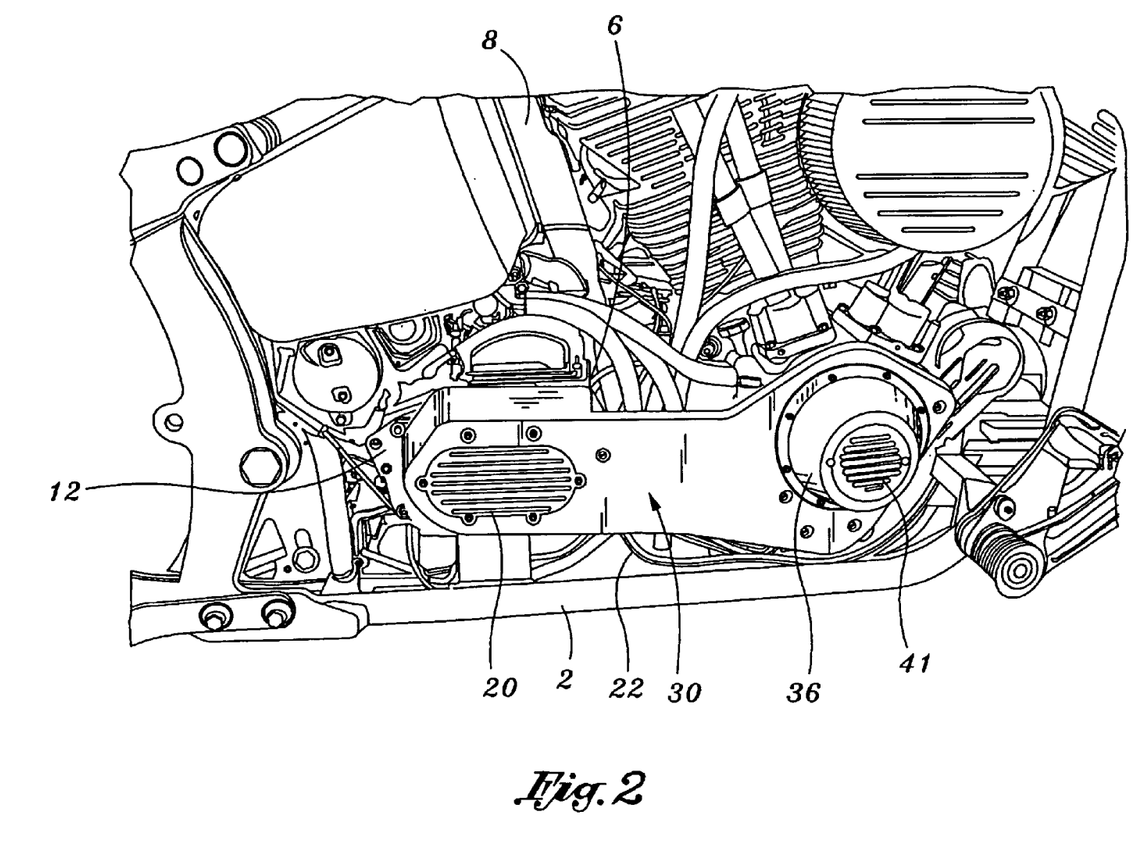
FIG. 2 shows an exemplary first embodiment of an interbrace installed on the well-known V-twin engine and transmission, according to an aspect of the present invention.
Figure 3A:
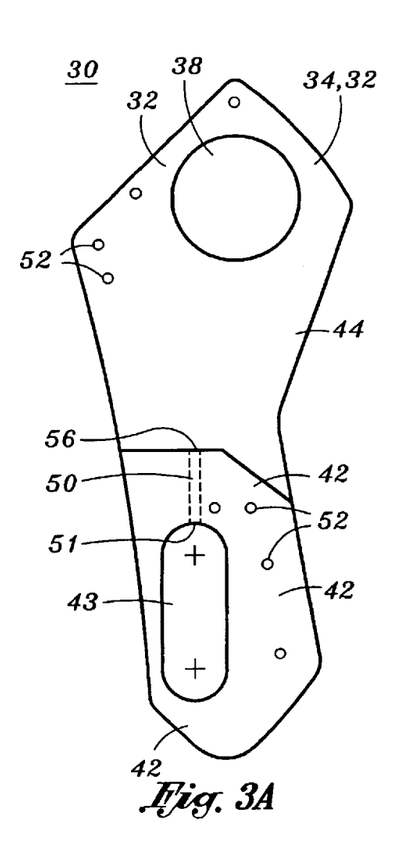
FIGS. 3A–C show a backside, top and bottom view of the first embodiment, according to an aspect of the present invention.
Figure 3B:
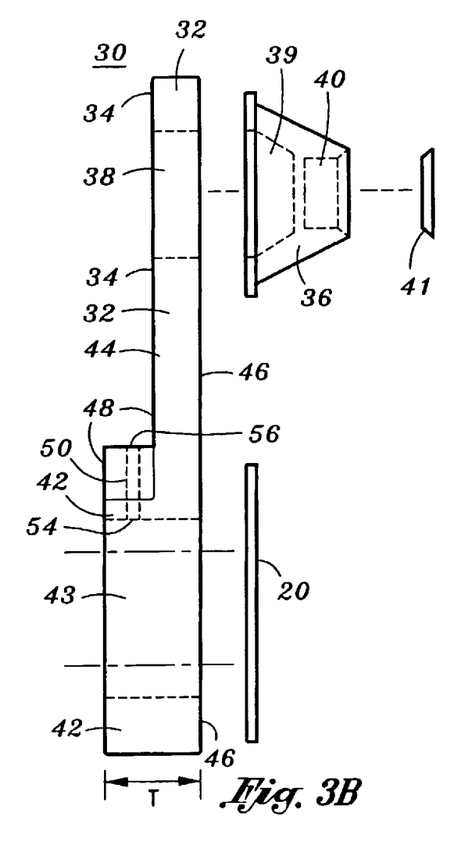
Figure 3C:
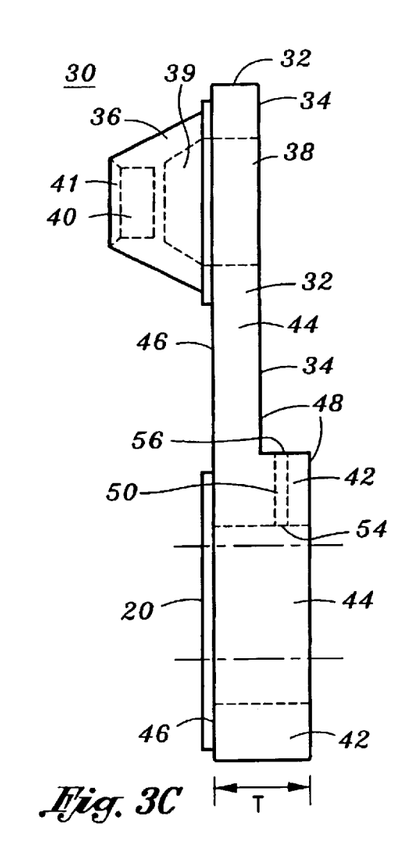

FIGS. 2 through 3A–C depict an exemplary first embodiment interbrace 30. In the first embodiment, the engine end plate 10 and transmission end cap 14 (see FIG. 1) becomes an integral portion of the interbrace 30. Generally, the outer perimeter and shape of the first embodiment 30 resembles that of shoe sole and heel (see FIGS. 3A–C). The interbrace 30 includes an outboard side 46 and an inboard side 48. The interbrace 30 further includes a forward engine end flange portion 32, a connecting portion 44, and transmission end cap portion 42. The interbrace 30 is preferably milled from high strength, light weight alloy billet. However, the interbrace 30 may also be formed by any number of other metal forming processes, known in the motorcycle engine casing and transmission casing manufacturing industry. For example, the interbrace 30 may be forged, die-cast (see FIG. 5) of use a combination of various metal forming and/or milling processes known in the art.

The engine end flange portion 32 forms a flange which interfaces the rightside of the V-twin engine 4. An engine-to-interbrace interface portion 34 performs the same function as an engine end plate 10 (see FIG. 1). A cam gear cavity 38 is disposed in the engine end plate portion 32 to accept the cam gears from the engine 4. On the opposing side (outboard face 46), a cam gear cover 36 may either be integrally formed to the interbrace 30 (see FIG. 3C), or an entirely separate cam gear cover 36 may be utilized (see FIG. 3B). Moreover, concentrically disposed internally within the cam gear cover 36 is a second cam gear cavity 39 which contiguously abuts next to the first cam gear cavity 38 to form a continous cavity 38, 39 adapted to receive the cam gearing. Concentrically disposed from an outboard side of the cam gear cover 36, is a timing cavity 40 which provides access for adjusting timing components of the engine 4. A removable timing cavity cap 41 is also provided to cover the timing cavity 40. The form and function of the first and second cam gear cavity 38, 39 and the timing cavity 40 are well-known in the art and may be conformed and adapted to a variety of configuration which fit numerous variants of well-known V-twin engines.

A transmission end cap portion 42 functions as the transmission end cap 14 (see FIG. 1). The end cap portion 42 preferably has a thickness T which is at least the thickness of a conventional rightside transmission end cap 14, and even more preferably a thickness T which provides sufficient offset from the transmission end plate 12 (see FIG. 1), such that the outboard face 46 may be a substantially flat planar surface. Disposed within the transmission end portion 42 is a transmission end cavity 43 which has a similar form to cavities disposed within a standard transmission end cap 14 (see FIG. 1) that are well-known in the art. Additionally, an internal conduit 50 is provided in the end cap portion 42 which is adapted to receive the clutch cable 22. In particular, the internal conduit has an internal port 54 which opens up into the transmission end cavity 43 and an external port 56 which is adapted to receive the clutch cable 22. The interbrace 30 further has a plurality of mounting holes 52 which are positioned to conform to the standard bolt patterns of a rightside engine end plate 12 and the standard bolt patterns of the transmission end cap 14. It is recognized that mounting holes 52 may be located in many positions which may be dictated by existing bolt patterns on the many variants of the V-twin engine and transmission ends. Thus, it is also recognized that the position of mounting holes 52 shown in the Figures is merely exemplary.

Figure 4:
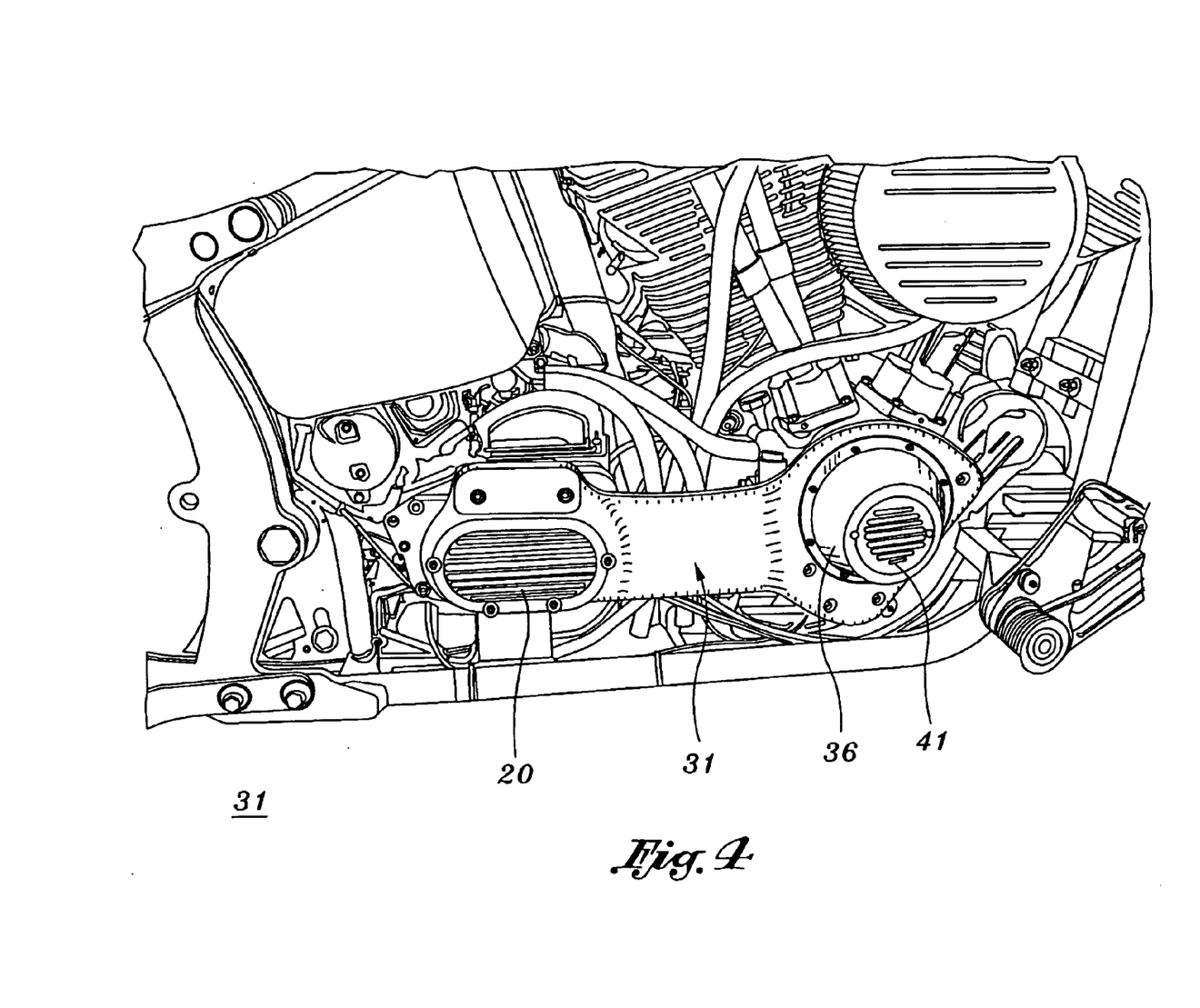
FIG. 4 shows an exemplary alternative first embodiment of an interbrace installed on the well-known V-twin engine and transmission, according to an aspect of the present invention.

FIG. 4 shows an exemplary alternative first embodiment of an interbrace 31 installed on the well-known V-twin engine and transmission, according to an aspect of the present invention. The interbrace 31 is preferably formed from a die-cast process. The alternative first embodiment interbrace 31 is similar to the interbrace 30 except it is die-cast or for weight and cost reduction, and die-casting allows for a variety of outboard face 46 shapes.

Second Embodiment of the Present Invention

Figure 5:
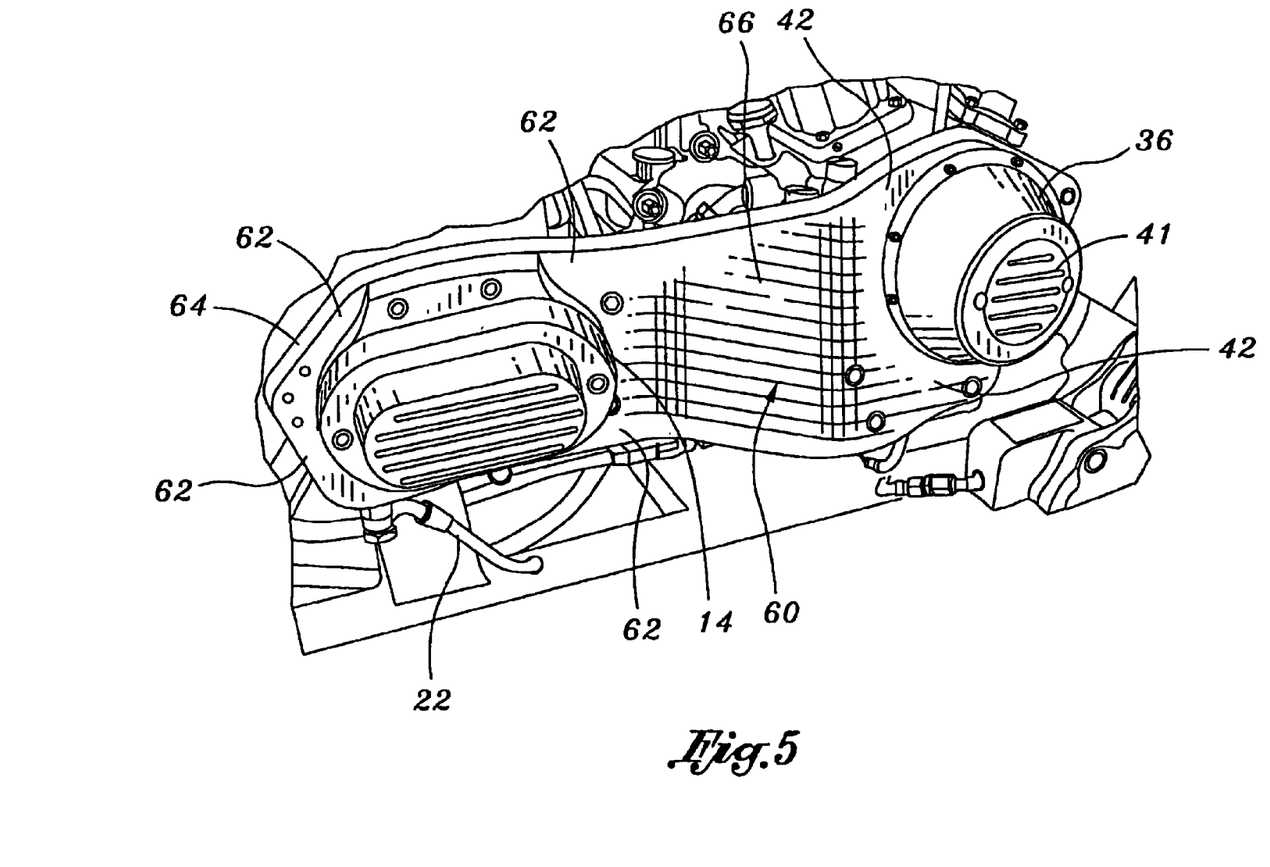
FIG. 5 shows an exemplary second embodiment of an interbrace installed on the well-known V-twin engine and transmission, according to an aspect of the present invention.
Figure 6A:
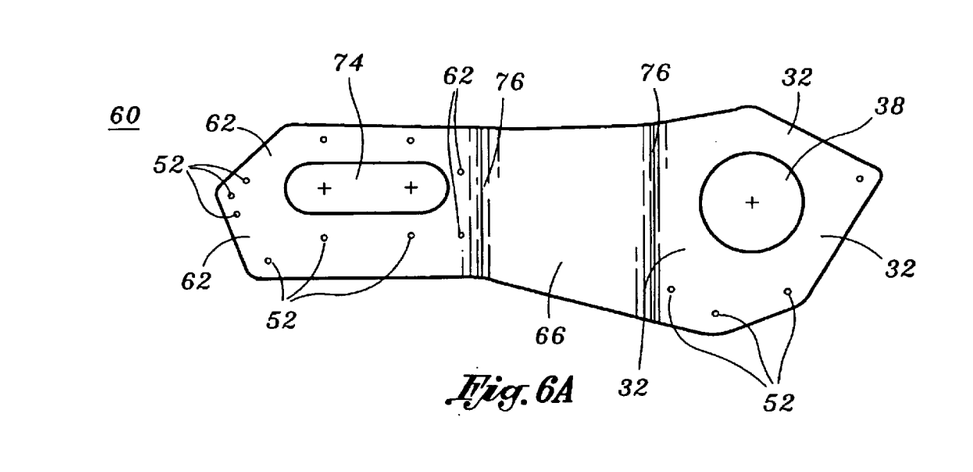
FIGS. 6A–B show a side and top view of the second embodiment, according to an aspect of the present invention.
Figure 6B:
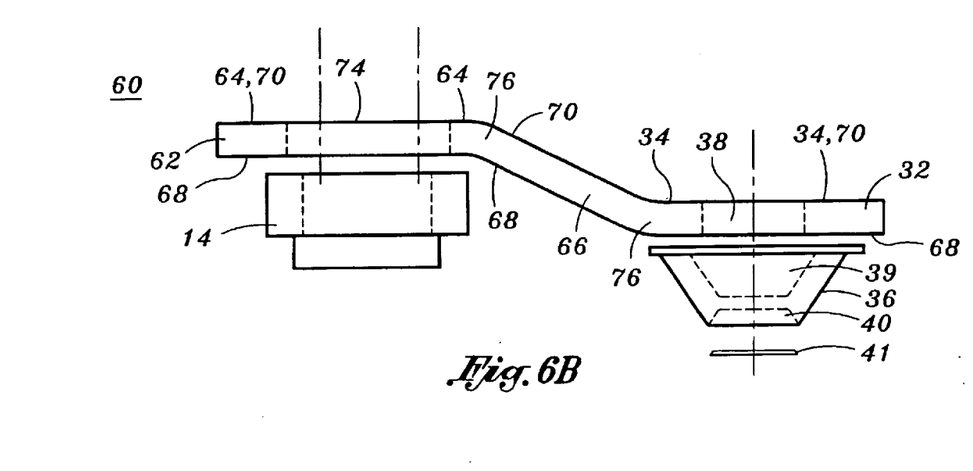

FIG. 5 shows an exemplary second embodiment of an interbrace 60 installed on the well-known V-twin engine and transmission, according to an aspect of the present invention. While, FIGS. 6A–B show a side and top view of the second embodiment interbrace 60, according to an aspect of the present invention. The second embodiment interbrace 60 utilizes a similar engine end plate portion 32, cam gear cover 36, and timing cavity cap 41 similar to that of the first embodiment. A difference with the second embodiment interface 60 (as compared to the first embodiment 30, 31) is that it has a transmission end plate portion 62 which replaces the transmission end plate 12 (see FIG. 1) from a standard transmission 6. Thus, instead of integrally molding the transmission end cap 14 into the interbrace 60 (as is accomplished in the first embodiment interbrace 30), the transmission end plate portion 62 provides a transmission-to-interbrace flange 64 which performs the same function as the transmission end plate 12 (see FIG. 1). Furthermore, since the transmission end plate portion 62 is inwardly offset from the engine portion 32, an offsetting connecting portion 66 is provided which angles further outboard of the rightside of the motorcycle so that the engine-to-interface 34 of the engine end portion 32 may be flushly attached to the rightside of the V-twin engine 4.

In a most generalized perspective, the outer shape of the first embodiment 60 resembles that of shoe sole without heel (see FIG. 6A). The interbrace 60 includes an outboard side 68 and an inboard side 70. In the case of the second embodiment, the interbrace 60 is preferably formed from a high strength, light weight alloy plate, such as aluminum. To form the offsetting connecting portion 66, the interbrace 60 is preferably bent at bending regions 76. However, the interbrace 60 may also be formed by any number of other metal forming processes, known in the metal forming industry. For example, the interbrace 60 may be milled from billet, forged, die-cast or use a combination of various metal forming and/or milling processes known in the art.

FIG. 6B shows an exploded view of the interbrace 60. It is noted that a stock or originally configured transmission end cap 14 may be used in conjunction with interbrace 60. Additionally, the cam gear cover 36 and timing cavity cap 41 are preferably separate components. The interbrace 60 further has a plurality of mounting holes 52 (see FIG. 6A) which are positioned to conform to the standard bolt patterns of a rightside engine end plate 12 and the standard bolt patterns of the transmission end cap 14. It is recognized that mounting holes 52 may be located in many position which may be dictated by existing bolt patterns on the many variants of the V-twin engine and transmission ends. Thus, it is also recognized that the position of mounting holes 52 shown in the Figures is merely exemplary.

Figure 7:
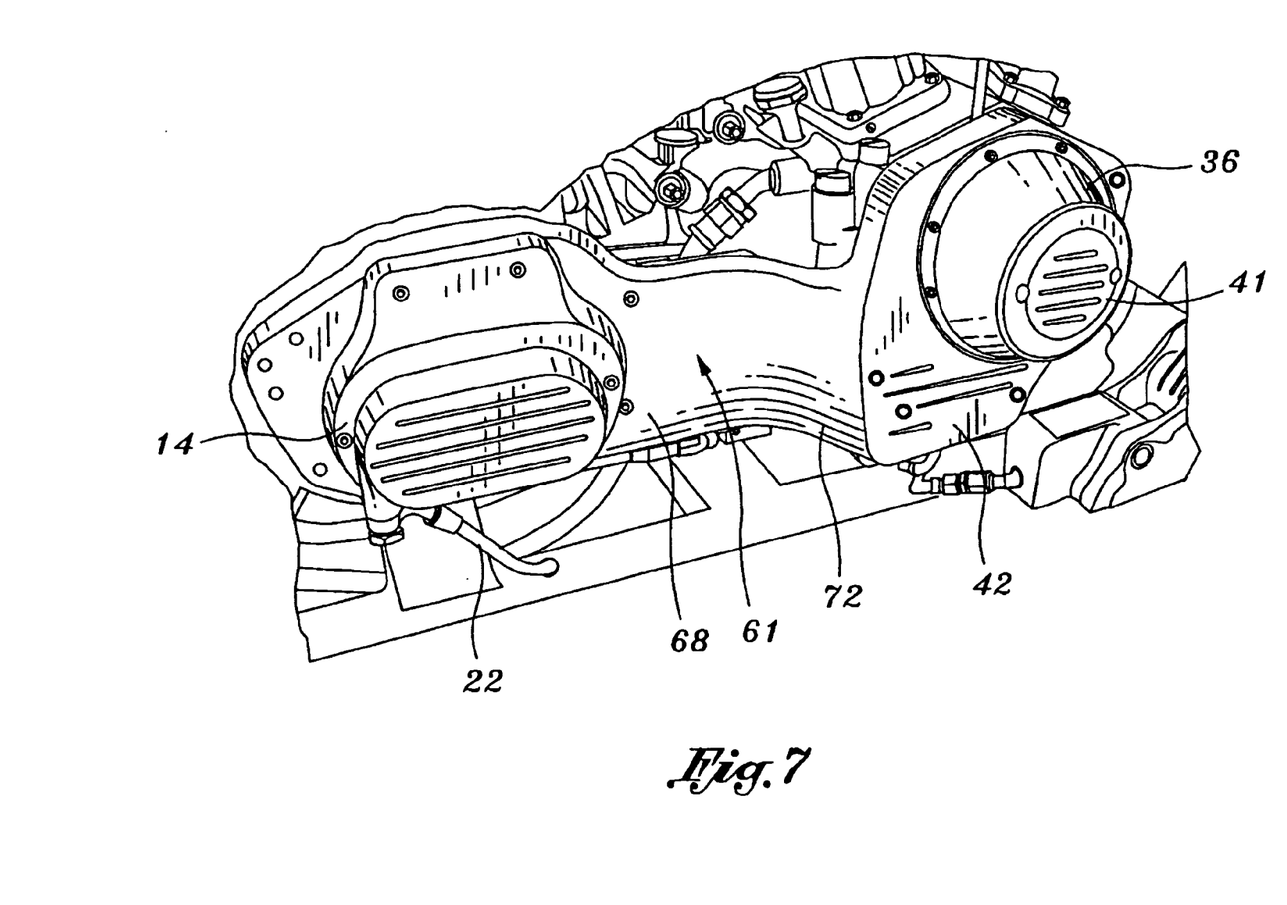
FIG. 7 shows an exemplary alternative second embodiment of an interbrace, according to an aspect of the present invention.

FIG. 7 shows an exemplary alternative second embodiment of an interbrace 61, according to an aspect of the present invention. The alternative interbrace 61 is preferably formed from at least one of, or a combination of forging, bending, and die-casting or any other metal working/forming process known in the art. The alternative second embodiment interbrace 61 is similar to the interbrace 60 except it may be forged, bent and/or die-cast to maximize both strength and accommodate the outward bend 72. Additionally, the interbrace 61 may be forged, bent and/or die-cast for weight reduction and cost-reduction purposes, and because forging and die-casting allows for a variety of outboard side shapes.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such are within the scope of the appended claims.

What is claimed is:

1. An interbrace for reducing torquing, twisting, and pivoting between a V-twin engine and a motorcycle transmission, wherein the V-twin engine is positioned forward the transmission, the rightside of the V-twin engine including a cam gear cover and the rightside of the transmission including an end cap, said interbrace having an inboard and outboard side, said interbrace comprising:
   a forward engine flange portion;
   a rearward transmission end cap portion which functions as a transmission end cap; and
   a connecting portion interconnecting said engine flange portion and said transmission end portion.

2. The interbrace according to claim 1, said engine flange portion further comprising a first cam gear cavity centered about a first axis transversely oriented with respect to the outboard and inboard side, wherein the first cam gear cavity is adapted to receive cam gear component protruding from the engine.

3. The interbrace according to claim 2, further comprising a cam gear cover.

4. The interbrace according to claim 3, wherein said cam gear cover is removably attached from the outboard side of said engine flange portion.

5. The interbrace according to claim 3, wherein said cam gear cover is integrally and unitarily formed to said forward engine flange portion.

6. The interbrace according to claim 3, said cam gear cover having a second cam gear cavity concentrically disposed within an inner portion of said cam gear cover, and a timing cavity concentrically disposed within an outboard portion of said cam gear cover.

7. The interbrace according to claim 6, wherein the first cam gear cavity and second cam gear cavity form a common concentric cavity.

8. The interbrace according to claim 6, further comprising a removable timing cover adapted to cover and to be attached to the timing cavity.

9. The interbrace according to claim 1, said rearward transmission end cap portion further comprising an inboard offset portion which gives said rearward transmission end cap portion a thickness T which is at least the thickness of a conventional rightside transmission end cap.

10. The interbrace according to claim 9, wherein the inboard side of said rearward transmission end cap portion is adapted to interface with rightside transmission end plate of a motorcycle.

11. The interbrace according to claim 9, wherein the rearward transmission end cap portion thickness T allows the outboard side of said interbrace to comprise a substantially flat planar surface.

12. The interface according to claim 9, further comprising a transmission end cavity adapted to house components protruding from the transmission.

13. The interbrace according to claim 9, further comprising a transmission end cap cover removably attached to the outboard side of said engine rearward transmission end portion to cover the transmission end cavity.

14. The interbrace according to claim 9, further comprising an internal conduit adapted to receive a clutch cable, the conduit having a first port positioned on a bottom side portion of said transmission end cap portion and a second port connecting said internal conduit to the transmission end cavity.

15. The interbrace according to claim 1, further comprising a plurality of mounting holes for attaching said interbrace to the rightside of a V-twin engine and a rightside transmission end plate.

16. The interbrace according to claim 15, comprising a first set of mounting holes positioned on said forward engine flange portion such that a first bolt pattern is provided which matches that of a rightside of a V-twin engine.

17. The interbrace according to claim 15, comprising a second set of mounting holes positioned on said rearward transmission end cap portion such that a second bolt pattern is provided which matches the rightside transmission end plate.

18. The interbrace according to claim 1, wherein said interbrace is milled from billet material.

19. An interbrace for reducing torquing, twisting, and pivoting between a V-twin engine and a motorcycle transmission, wherein the V-twin engine is positioned forward the transmission, the rightside of the V-twin engine including a cam gear cover and the rightside of the transmission including an end cap, said interbrace having an inboard and outboard side, side interbrace comprising:

a forward engine flange portion having a first cam gear cavity disposed therethrough;

a rearward transmission end plate flange portion having a transmission end plate cavity disposed therethrough; and a connecting portion interconnecting said engine flange portion and said transmission end plate flange portion.

20. The interbrace according to claim 19, the first cam gear cavity centered about a first axis transversely oriented with respect to the outboard and inboard side, wherein the first cam gear cavity is adapted to receive cam gear components protruding from the engine.

21. The interbrace according to claim 20, further comprising a cam gear cover removably attached the outboard side of said flange portion.

22. The interbrace according to claim 21, said cam gear cover having a second cam gear cavity concentrically disposed within an inner portion of said cam gear cover, and a timing cavity concentrically disposed within an outboard portion of said cam gear cover.

23. The interbrace according to claim 22, wherein the first cam gear cavity and second cam gear cavity form a common concentric cavity.

24. The interbrace according to claim 22, further comprising a removable timing cover adapted to cover and to be attached to the timing cavity.

25. The interbrace according to claim 19, said rearward transmission end plate flange portion being inwardly offset from said forward engine flange portion.

26. The interbrace according to claim 19, wherein the inboard side of said rearward transmission end plate flange portion is adapted to function as a rightside transmission end plate of a motorcycle.

27. The interbrace according to claim 19, wherein said forward engine flange portion and said rearward transmission end plate flange portion are oriented in parallel manner with respect to each other, and said connecting portion interconnects said engine flange portion and said transmission end plate flange portion at an inclined angle.

28. The interbrace according to claim 27, wherein a conventional transmission end cap is adapted to be attached directly to the outboard side of said rearward transmission end plate flange portion.

29. The interbrace according to claim 27, transmission end plate cavity adapted to receive components protruding from within the transmission.

30. The interbrace according to claim 19, further comprising a plurality of mounting holes for attaching said interbrace to a rightside of a V-twin engine and a rightside transmission end.

31. The interbrace according to claim 30, further comprising a first set of mounting holes positioned on said forward engine flange portion such that a first bolt pattern is provided which matches that of a rightside of the V-twin engine.

32. The interbrace according to claim 30, further comprising a second set of mounting holes positioned on said rearward transmission end plate flange portion such that a second bolt pattern is provided which matches that the rightside transmission end plate.

33. The interbrace according to claim 19, wherein said interbrace is formed by bending plate stock.

* * * * *